US009915746B2

(12) United States Patent
Eick et al.

(10) Patent No.: US 9,915,746 B2
(45) Date of Patent: Mar. 13, 2018

(54) MARINE SEISMIC SURVEYING INCLUDING DIRECT FAR FIELD MEASUREMENTS

(71) Applicant: CONOCOPHILLIPS COMPANY, Houston, TX (US)

(72) Inventors: Peter M. Eick, Houston, TX (US); Joel D. Brewer, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 117 days.

(21) Appl. No.: 14/800,812

(22) Filed: Jul. 16, 2015

(65) Prior Publication Data

US 2016/0018546 A1      Jan. 21, 2016

Related U.S. Application Data

(60) Provisional application No. 62/025,559, filed on Jul. 17, 2014.

(51) Int. Cl.
*G01V 1/38* (2006.01)
*G01V 1/36* (2006.01)
(Continued)

(52) U.S. Cl.
CPC .......... *G01V 1/3808* (2013.01); *G01V 1/3852* (2013.01); *G01V 1/3861* (2013.01); *B63B 22/22* (2013.01); *B63B 2022/006* (2013.01)

(58) Field of Classification Search
CPC .. G01V 1/3808; G01V 1/3852; G01V 1/3861; B63B 2022/006; B63B 22/22
(Continued)

(56) References Cited

U.S. PATENT DOCUMENTS 4,694,435 A * 9/1987 Magneville ............... G01V 1/38
367/154
4,958,328 A * 9/1990 Stubblefield ............. G01V 1/38
181/110
(Continued)

FOREIGN PATENT DOCUMENTS

WO      WO 9737246 A1 * 10/1997    ............. G01V 1/201
WO      20130137974 A1    9/2013
(Continued)

OTHER PUBLICATIONS

International Search Report dated Oct. 1, 2015 for PCT/US2015/040747; 5 pgs.

*Primary Examiner* — Daniel L Murphy
(74) *Attorney, Agent, or Firm* — ConocoPhillips Company (57) ABSTRACT

A method of measuring seismic signals generated by marine acoustic sources includes deploying at least one seismic sensor unit to a location on a floor of a body of water within a survey area, and recording seismic signals that include a real measured far field signature generated by a seismic source during a marine seismic survey. The method further includes automatically actuating a retrieval device to cause the at least one seismic sensor unit to rise to the surface, in response to expiration of the selected time period or an actuation signal from the surface, retrieving the at least one seismic sensor unit from the surface, and processing seismic data collected from the return signal. Processing including identifying a far field signature of the seismic source based on the signals detected by the seismic sensor, and designaturing the seismic data based on the far field signature.

20 Claims, 3 Drawing Sheets

(51) Int. Cl.
*B63B 22/22* (2006.01)
*B63B 22/00* (2006.01)

(58) Field of Classification Search
USPC .................................................. 367/15, 24
See application file for complete search history.

(56) References Cited

U.S. PATENT DOCUMENTS

| | | | | |
|---|---|---|---|---|
| 4,970,697 | A * | 11/1990 | Earley | G01V 1/3808 |
| | | | | 181/112 |
| 5,113,377 | A * | 5/1992 | Johnson | G01V 1/38 |
| | | | | 181/110 |
| 6,088,299 | A * | 7/2000 | Erath | G01V 1/201 |
| | | | | 367/123 |
| 6,256,589 | B1 * | 7/2001 | Gallotti Guimaraes | G01V 1/3861 |
| | | | | 367/20 |
| 6,418,082 | B1 | 7/2002 | Hollis et al. | |
| 8,000,168 | B2 | 8/2011 | Eick et al. | |
| 9,086,502 | B2 * | 7/2015 | Martinez | G01V 1/20 |
| 2005/0052951 | A1 * | 3/2005 | Ray | G01V 1/247 |
| | | | | 367/188 |
| 2005/0169713 | A1 | 8/2005 | Luc et al. | |
| 2013/0083623 | A1 * | 4/2013 | Brizard | G01V 1/3852 |
| | | | | 367/15 |
| 2013/0101355 | A1 | 4/2013 | Thompson et al. | |
| 2013/0201791 | A1 | 8/2013 | Parkes et al. | |
| 2014/0036624 | A1 | 2/2014 | Tonchia | |

FOREIGN PATENT DOCUMENTS

| | | | | |
|---|---|---|---|---|
| WO | WO 2013137974 A1 * | 9/2013 | | G01V 1/38 |
| WO | 2014076075 A2 | 5/2014 | | |

* cited by examiner

MARINE SEISMIC SURVEYING INCLUDING DIRECT FAR FIELD MEASUREMENTS

CROSS-REFERENCE TO RELATED APPLICATIONS

This application is a non-provisional application which claims benefit under 35 USC § 119(e) to U.S. Provisional Application Ser. No. 62/025,559 filed Jul. 17, 2014, entitled "MARINE SEISMIC SURVEYING INCLUDING DIRECT FAR FIELD MEASUREMENTS," which is incorporated herein in its entirety.

FIELD OF THE INVENTION

This invention relates to systems and processes for seismic data acquisition and processing. In another aspect, the invention concerns acquiring and processing seismic data acquired by a marine survey for analysis of earth formations, which includes directly measuring far field seismic data.

BACKGROUND OF THE INVENTION

Seismic reflection surveying is a technique that involves sending acoustic pulses into a subterranean formation and measuring reflected signals to image subsurface areas. Identification and imaging of subsurface areas is useful for hydrocarbon exploration.

Marine seismic surveys are conducted using marine seismic sources and recorders, e.g., using vessels that include or tow seismic sources and receivers. In some surveys, seismic data acquisition is conducted in a survey area over various locations of an earth surface, during which seismic signals are emitted from the sources and seismic energy reflected from a formation are detected. The seismic data is analyzed to estimate properties of the formation. Each seismic source emits a characteristic signal, or signature, which propagates through a body of water. Identification of source signatures is important for use in processing seismic data to achieve an accurate representation of formation properties. If the source signal is not known accurately then variations in the source signal may be misinterpreted during processing of the data as variations in the geology of the formations detected.

SUMMARY OF THE INVENTION

An embodiment of a method of measuring seismic signals generated by marine acoustic sources includes deploying at least one seismic sensor unit from a surface of a body of water to a location on a floor of the body of water within a survey area, the at least one seismic sensor unit including a seismic sensor and a recording device configured to receive and store seismic data, and recording, by the recording device, seismic signals detected by the seismic sensor over a selected time period. The seismic signals include a real measured far field signature generated by a seismic source during a marine seismic survey. The method also includes performing the marine seismic survey, which includes generating a seismic signal by the seismic source at a plurality of locations above one or more shot points in the survey area and receiving a return signal reflected from an earth formation at one or more seismic receivers located above the survey area. The method further includes automatically actuating a retrieval device disposed at the at least one seismic sensor unit to cause the at least one seismic sensor unit to rise to the surface, in response to expiration of the selected time period or an actuation signal from the surface, retrieving the at least one seismic sensor unit from the surface, and processing seismic data collected from the return signal. Processing including identifying a far field signature of the seismic source for each of the plurality of locations based on the seismic signals detected by the seismic sensor, and designaturing the seismic data based on the far field signature to appropriately relate the far field signature to the correct shot point and time.

An embodiment of an apparatus for measurement of seismic signals generated by marine acoustic sources includes a seismic sensor, a recording device configured to receive and store seismic data, and a housing assembly including a structure configured to house the seismic sensor and the recording device. The housing assembly is configured to be released in a body of water and rest at one of a location on a floor of the body of water and a depth above the location. The apparatus also includes a recording device actuator disposed at the housing assembly and configured to actuate the recording device to record seismic signals detected by the seismic sensor over a selected time period, the selected time period including a time during which a marine seismic survey is performed, the seismic signals including a real measured far field signature generated by a seismic source during the marine seismic survey. The apparatus further includes an automatic retrieval device configured to raise the housing assembly to a surface of the body of water for retrieval, the retrieval device including a retrieval device actuator configured to actuate the retrieval device in response to expiration of the selected time period or an actuation signal from the surface.

An embodiment of a system for measurement of seismic signals generated by marine acoustic sources includes a plurality of seismic sensor units configured to be deployed from a surface of a body of water at different locations on a floor of the body of water within a survey area, each of the seismic sensor units configured to record seismic signals autonomously and without physical connection to one another or to the surface. Each of the plurality of seismic sensor units includes one or more seismic sensors, a recording device configured to receive and store seismic data, and a housing assembly including a structure configured to house the one or more seismic sensors and the recording device. The housing assembly is configured to be released in the body of water and rest at a location on the floor of the body of water. Each of the plurality of seismic sensor units also includes a recording device actuator disposed at the housing assembly and configured to actuate the recording device to record seismic signals detected by the one or more seismic sensors over a selected time period, the selected time period including a time during which a marine seismic survey is performed, the seismic signals including a far field signature generated by a seismic source during the marine seismic survey. Each of the plurality of seismic sensor units further includes an automatic retrieval device configured to raise the housing assembly to a surface of the body of water for retrieval, the retrieval device including a retrieval device actuator configured to actuate the retrieval device in response to expiration of the selected time period or an actuation signal from the surface.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Apparatuses, systems and methods are provided for acquiring seismic data in a marine environment, and processing such data to evaluate earth formations. An embodiment of a seismic acquisition system includes one or more seismic sources and one or more seismic receivers configured to be deployed in a marine environment. A measured real far field sensor system includes one or more seismic sensor units configured to directly measure the far field signatures of one or more seismic sources. In one embodiment, the measured real far field sensor system includes one or more seismic sensor units disposed on the floor of a body of water to directly measure the far field signatures. For example, an array of sensor units are deployed at multiple locations in a survey area.

In another embodiment, the measured real far field sensor system includes a plurality of sensors or sensor units deployed at multiple depths. For example, multiple sensors are deployed on a segment of cable having a selected length to accommodate sensors at desired depths (e.g., several tens of meters long). This cable may have a floatation device on the end of the cable that would cause the cable to be pulled up in the water column to allow measurement of the downgoing and upgoing wavefield in the water column at several levels. By measuring the wavefield in this manner, a more accurate representation of the actual far field signature can be derived over a single sensor on the seafloor. This embodiment may have potential depth related impacts. For example, in shallow waters the cable segment could be a tangle risk for fishing or may be so long that it would be on the surface and create a shipping hazard. In another example, in extremely deep waters, the cable would have to be selected to be able to withstand the associated pressures. In both of these examples, the problems could be overcome by either not using the cable and accepting a degraded signal from the sensor sitting on the ocean bottom, or selecting the appropriate cable at deploy time.

The number and configuration of seismic sources or source units is not limited to the embodiments described herein. The seismic sources (or source units) can be arrayed or positioned at any suitable locations based on, e.g., the survey area and survey pattern, and the depths at which far field signature measurements are desired. It is noted that the measured real far field sensor system may include one or more sensors deployed on the floor, sensors deployed in the water column at various depths, or a combination of floor sensors and sensors deployed at one or more depths in the water column.

In one embodiment, the seismic sensor units are arrayed on the floor and/or at selected depths in a survey area to detect far field signatures from sources deployed or towed over various locations to more accurately capture the variations in the source output and directionality. The seismic sensor units may be deployed individually or as a system and equipped with retrieval devices, such as an automatic buoy system, that retrieve the seismic sensor units after a predetermined period of time. Recent testing has shown that this method is surprisingly easy to work with and buoys were recovered quickly even after storms and rough weather. In one embodiment, each seismic sensor unit is configured to be deployed as a self-contained unit, and record autonomously without requiring user intervention.

An embodiment of a seismic data acquisition and processing method includes emitting seismic signals during a survey and receiving seismic data representing return signals that have reflected from subterranean earth regions or formations. Far field signatures measured by the seismic sensor units are synchronized with or correlated to the source emissions, e.g., using GPS locations. In another embodiment synchronization can be established by firing the source array in different patterns to establish coding that can easily be found in the data set. An example would be firing 4 shots in a row at 4 seconds timing instead of the normal 10 second firing timing. The far field signatures are then derived and used in processing the seismic data.

Figure 1:
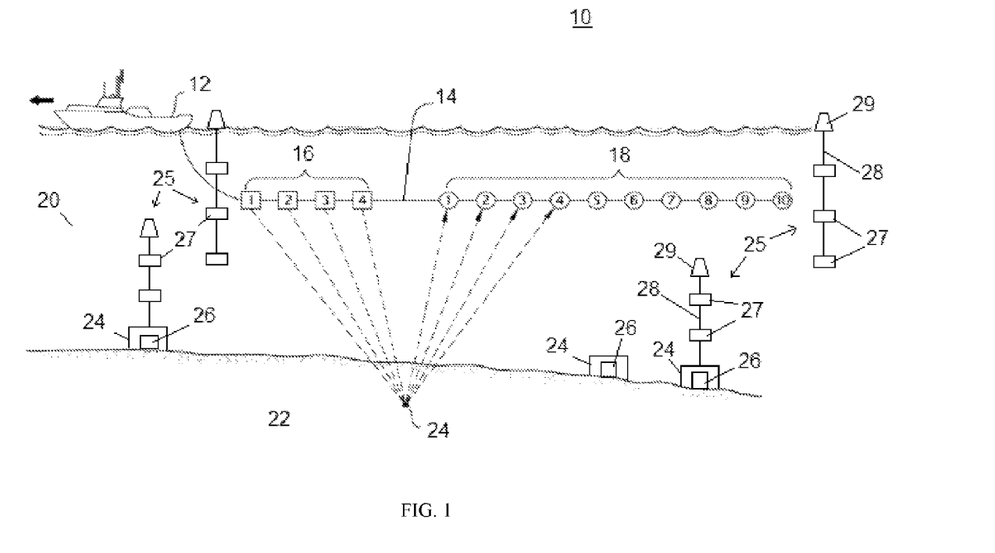
FIG. 1 depicts an embodiment of a marine seismic data acquisition system.

FIG. 1 illustrates an embodiment of a marine seismic measurement system 10. The system 10 includes a marine vessel 12 configured to tow or otherwise deploy one or more seismic sources, and may also be used to deploy one or more near field sensors and/or one or more far field seismic sensor units. In one embodiment, the vessel 12 is configured to tow one or more streamers 14, each of which are connected to one or more seismic sources 16 and seismic receivers 18. The seismic sources 16 may be any type of source capable of emitting acoustic energy sufficient to propagate through a body of water 20 and into a region of an earth formation 22. Exemplary seismic sources include air guns and marine vibrators. The seismic receivers 18 may include any suitable device capable of recording seismic signals reflected from the formation 22, such as hydrophones, accelerometers and others.

In one embodiment, the seismic sources 16 include an array of air guns that are charged with compressed air and then vented either simultaneously or separately. For example, the air guns in the array are vented according to a pattern of delays so that an identifiable seismic pattern or signature is emitted.

Although the seismic sources 16 are described as air guns, they are not so limited. Any suitable source can be used that is capable of emitting a recognizable seismic signal. For example, the seismic sources 16 can be marine vibrators that can be vibrated at one or multiple frequencies. Frequencies may be varied, and multiple vibrators may be actuated together to create a complex source signal. In addition, individual sources or groups of sources can be encoded, using, for example, phase coding and/or frequency coding.

In one embodiment, one or more seismic sensor units 24 are deployed from the surface of the body of water 20 and rest on the floor of the body of water 20 with sensors deployed in or near the unit 24. In addition, one or more variable depth sensor assemblies 25 may be deployed at one or more selected locations over the survey area. Each sensor assembly is configured to deploy sensor units 27 (which may be individual sensors or sensor assemblies including one or more sensors) in the water column at different depths in the water column. In one embodiment, the variable depth sensor assembly 25 includes a cable 28 to which the sensor units 27 are attached, and is held up with a float 29. The variable depth sensor assembly 25 may include a floor unit, such as a sensor unit 24 or anchoring device that holds the sensors 27 at a relatively fixed position but at variable depths, or may extend toward the marine floor from a float 29 at the surface.

Each seismic sensor unit 24 and/or variable depth sensor assembly 25 is individually deployable and configured to operate at least without physical connection to the surface, and may also be configured to operate autonomously without requiring user input or interaction with other sensor units or devices. In one embodiment, each seismic sensor unit 24 includes a seismic sensor assembly 26 and each variable depth sensor assembly includes sensor units 27 held up with a float 29. Each seismic sensor assembly 26 and sensor unit 27 includes one or more hydrophones or other seismic sensors. In other embodiments, a single seismic sensor assembly 26 would be deployed in or nearby the unit 24. Each seismic sensor unit may include additional components, such as processors and memory devices to record and/or store seismic data, retrieval devices or systems, platforms or anchoring devices, location devices, and/or communication devices.

Figure 2:
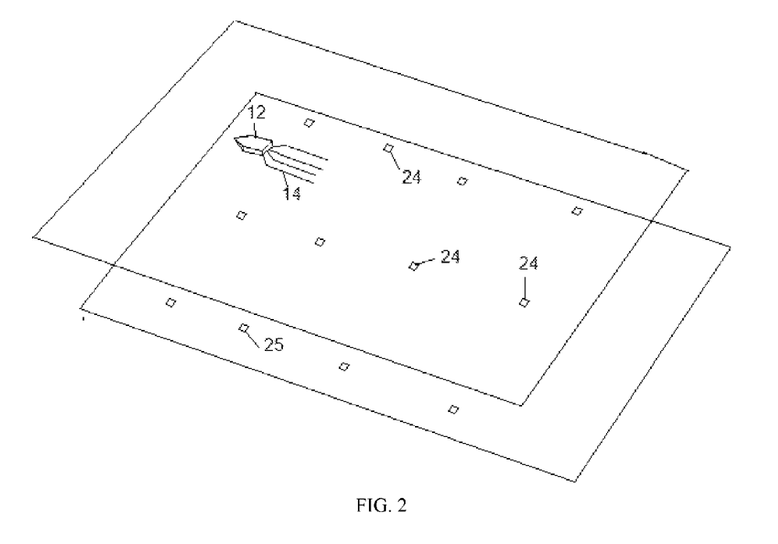
FIG. 2 depicts an embodiment of a seismic far field signature measurement system deployed in a survey area.

In one embodiment, a plurality of the seismic sensor units 24 and/or variable depth assemblies 25 are deployed at different locations on the floor within a selected survey area. For example, as shown in FIG. 2, a plurality of seismic sensor units 24 are arrayed as individual nodes in a grid pattern on the sea or ocean floor. The distance between each seismic sensor unit 24 is not limited, and the array pattern may be any desired pattern. In the example of FIG. 2, the seismic sensor units 24 are arrayed as a square grid, with approximately 10 km between adjacent units. The array may include only floor seismic sensor units 24, only variable depth seismic sensor assemblies 25, or a combination of units 24 and assemblies 25.

In one embodiment, the seismic sensor unit or units are configured to record seismic signals emitted from seismic sources at the surface of a body of water, e.g., signals from sources 16. Such signals include far field signatures, which are recorded and used for analyzing seismic data generated by detecting seismic signals that have reflected in the formation. The seismic sensor units, in one embodiment, are self-contained and are configured to be deployed at a floor location and operate on the floor for selected and/or extended periods of time without requiring physical connection to the surface.

Components of the system 10 may be used to measure the far field signatures and/or near field signatures of seismic sources. Each seismic source or group of sources (e.g., an air gun or air gun array) produces a signature seismic signal, or recognizable pattern of seismic energy. This signature includes two parts: a near field signature and a far field signature. The near field signature is the signature created by the air guns or other seismic sources before an emitted seismic signal is affected by reflection of the signal off of the surface of the water. The near field signature occurs at a relatively short distance from the source, e.g., up to the source array size or about 10 to 15 meters. The near field signature can be detected by sensors (e.g., hydrophones) mounted in close proximity to the acoustic sources, i.e., within the near field signature range.

The far field signature is the signature created by seismic sources that includes a combination of the original signature created by the sources and portions of the emitted signal that have reflected off of the water surface. The far field signature occurs at distances beyond those associated with the near field signature. The seismic sensor units, individually or as an array, are configured to be disposed on the floor of a body of water and detect and record seismic signals, which are used to measure the true far field signatures that are generated during a marine seismic survey. In one embodiment, the seismic sensor units continuously record data from hydrophones or other sensors in each unit or node. Recordings by the nodes can be synchronized or correlated with times and/or locations of seismic sources during a survey, so that the far field signature of each seismic source can be identified.

Figure 3:
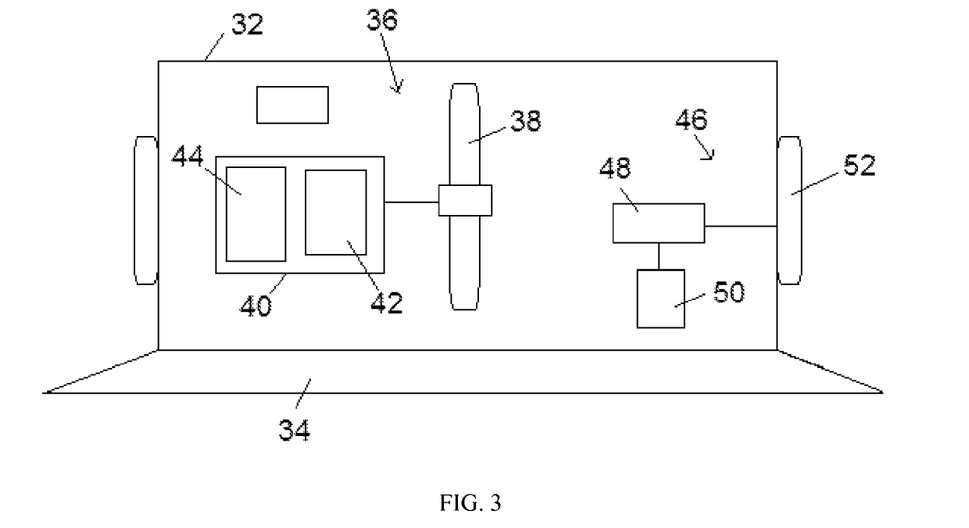
FIG. 3 depicts an embodiment of a seismic sensor unit configured to be deployed on the floor of a body of water and measure seismic signals.

One way to visualize the difference between the near field and the far field is to consider a choir. When you are close to the choir, the individual voices are easily detectable. Further away, they (hopefully) blend into a more single melodic sound. Just like the choir though, if you change your listening position, the single melodic sound changes which is why an array of measurements are better than a single measurement. Continuing the choir analogy, the near field is like recording the performance from microphones near the performers. The best efforts of the sound engineers are required to properly mix and blend the near field measurements of the sound to make it sound like the performance that one would hear in the audience. If the recording hardware was defective in the near field or they were blended poorly then the recorded music does not sound like the live performance. The same problem occurs when conventional near field recordings are used to derive the far field signal for processing of the data. FIG. 3 shows an embodiment of a seismic sensor unit 30, which can be used, for example, with the system 10. The seismic sensor unit includes a housing 32 made of a material suitable to withstand subsea pressures and conditions. All components required for deployment, seismic recording, retrieval and other desired functions are disposed in or with the housing so that the seismic sensor unit is self-contained and can operate without physical connection with the surface. A platform 34 may be included to facilitate stability of the unit 30 as the unit rests on the floor and act as an anchor that can be jettisoned to recover the rest of the unit.

Figure 4:
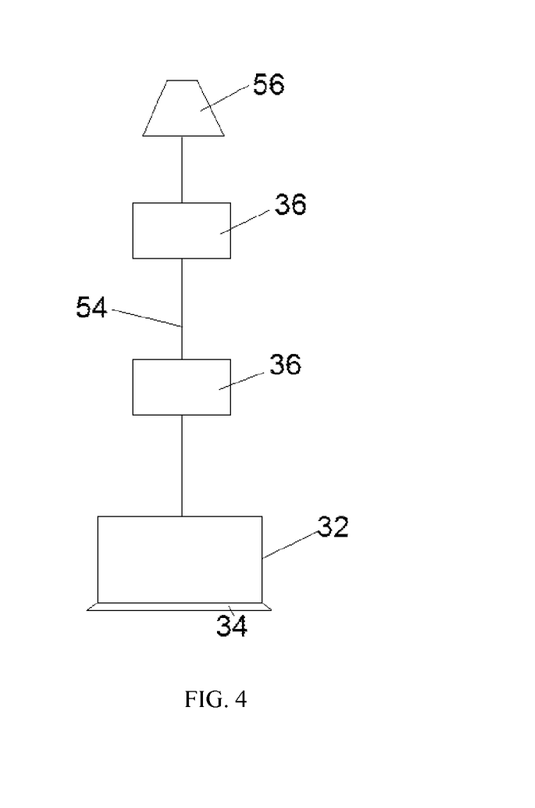
FIG. 4 depicts an embodiment of a seismic sensor assembly configured to measure seismic signals at multiple depths of a body of water.

A sensor assembly 36 includes one or more seismic sensors 38, such as a hydrophone or group of hydrophones, and a recording device 40 configured to receive signals from the sensor 38 and store seismic data. In one embodiment, as shown in FIG. 4, one or more additional sensor assemblies 36 are mounted on a cable 54 to obtain measurements in the water column at different depths. The cable 54 may be attached to a float 56 to hold the cable 54 up in the water column. For example, the recording device 40 includes electronics and/or a processor 42 to receive signals from the sensor 38 and generate associated seismic data, and a memory 44 to store the generated seismic data.

In one embodiment, the sensor assembly 36 includes a directional sensing device that allows seismic energy from different directions to be separated or individually recorded. For example, the seismic sensor 38 is a directional hydrophone that can separately measure or separate the seismic signals travelling downward (i.e., along a direction that extends from the surface to the marine floor), from those traveling upward (i.e., along a direction that extends from the marine floor and subterranean locations to the surface). This allows the far field signature to be separately identified relative to seismic signals that have reflected from the floor and the formation.

This directional capability can be realized in any suitable manner. For example, the sensor 38 can include both geophone and hydrophone sensors, or include a series of two or more hydrophones positioned vertically or upwardly in the water column (using, for example, cable 28 or 54, and float 29 or 56).

The seismic sensor unit 30, in one embodiment, is completely autonomous once deployed and requires no additional input from a user after deployment. For example, the recording device 40 is configured to activate and commence recording upon deployment, and continuously record signals from the seismic sensor 38 for a pre-determined period of time, e.g., the amount of time expected to elapse until completion of a survey or the time required for multiple surveys.

In one embodiment, a retrieval system 46 is included to effect retrieval of the seismic sensor unit. An exemplary retrieval system 46 includes a controller 48 connected to a compressed air source 50 and an inflatable buoy 52. The controller 48 may be separate or incorporated as part of the recording device 40. After a predetermined period of time, the retrieval unit 46 may be automatically activated to inflate the buoy 52 and cause the unit 30 to rise to the surface. In our experience this system has proven effective and even in rough weather the sensors were located quickly by tracking their approximate location using Inmarsat transponders and visual location. Painting the hardware and float bright yellow helped also.

Figure 5:
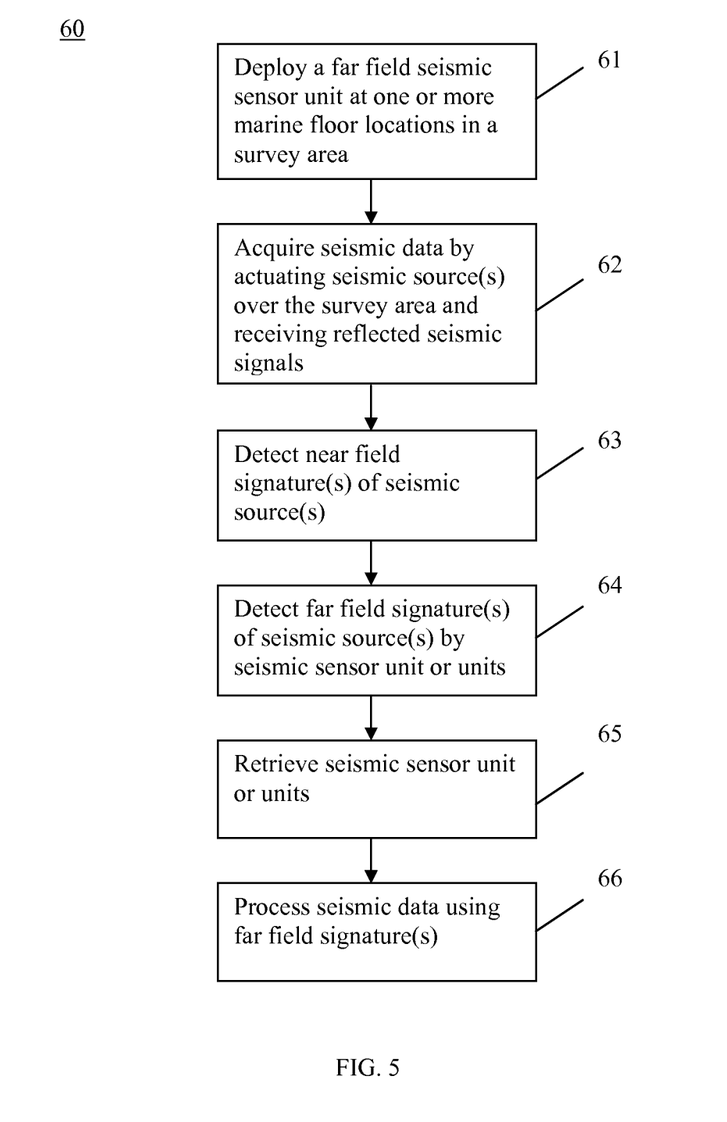
FIG. 5 is a flow chart illustrating an embodiment of a method of acquiring and/or processing seismic data.

FIG. 5 is a flowchart depicting an exemplary method 60 of acquiring and/or processing seismic data. The method 60 may be performed on any suitable processor, processing device and/or network. For example, the method may be performed using suitable processing devices in each seismic sensor unit, processor(s) on the vessel 12 and/or other devices located onshore or at any desired location. The method 60 includes one or more stages 61-66, which may be performed in the order described. In other embodiments, one or more of the stages may be performed in a different order. In addition, some of the stages may be performed concurrently or simultaneously.

In the first stage 61, a seismic sensor unit or a group of seismic sensor units are deployed. For example, a vessel is driven over the survey area and a far field seismic sensor unit 24 or variable depth assembly 25 is deployed and allowed to sink to the floor of a body of water and/or move to various depths. In one embodiment, a plurality of seismic sensor units, e.g., units 30, are periodically deployed so that the sensor units are arrayed as an approximate grid. It is noted that, in some cases, precise location of each unit on the floor is not necessary. In such cases, knowledge of the general unit locations based on the vessel location at which they were deployed is sufficient to correlate far field measurements with seismic sources and to be able to find the unit upon retrieval and recovery.

Although precise positioning may not be necessary, the seismic sensors units can be equipped with features or devices that allow for location determination. For example, an acoustic communication device 54 can be included in the seismic sensor unit 30, for communication with GPS location devices on surface vessels or buoys.

In the second stage 62, seismic data acquisition is performed. In one embodiment, one or more seismic sources are deployed above the survey area and approximately above a seismic sensor device. For example, a float system is used to deploy the sources at or near the water surface. The seismic sources are fired or otherwise actuated one or multiple times and at one or multiple locations over the survey area. In one embodiment, the source or sources are towed or moved over the survey area, and the seismic sources are activated at selected locations and/or as the sources move over selected locations. For example, the vessel 12 is moved in a grid pattern over a survey area such as that shown in FIG. 2.

Seismic data generated by the receiver or receivers in response to detecting the reflected waves (referred to herein as return signals or recorded signals) are stored and/or transmitted (e.g., via transmission cable in a streamer) to a storage location or processing device.

In the third stage 63, near field signatures of the sources are detected and data indicating the near field signatures ("near field data") is recorded and/or transmitted. The near field signatures can be detected using seismic receivers located proximate to the source or sources.

In the fourth stage 64, seismic signals emitted by the sources are detected by the seismic sensor unit or units, so that the seismic far field signature of the sources can be extracted. The seismic sensor unit or units record detected seismic signals for later processing. In one embodiment, recording devices in each seismic sensor unit continuously record detected signals over a selected period of time.

In the fifth stage 65, the seismic sensor unit or units are retrieved from the marine floor. In one embodiment, retrieval devices are activated to cause the unit or units to be transported to the surface. An exemplary retrieval device is a self-inflating buoy system, e.g., the retrieval system 46. In one embodiment, the retrieval device is automatically activated after a pre-determined period of time, which could be hours, days, weeks or more. In other embodiments, a retrieval device is activated by a remote signal, e.g., a radio or acoustic signal.

In the sixth stage 66, the seismic data from the receivers, near field detectors and/or far field seismic sensor units are processed or analyzed to estimate the reflected seismic signals and derive formation properties therefrom. The processing includes various techniques and processing procedures, one of which is correction of the seismic signals using the far field signature for each signal.

During processing, the actual measured far field signature of a source at a specific time and location can be identified and used to process seismic data acquired at that time and location. For example, the recorders in each seismic sensor unit include timers or counters to allow far field data to be associated with specific times or time periods. In addition, the location of a seismic sensor unit can be established by, e.g., GPS location. The location of each unit may be estimated by noting the location of a vessel when the device was deployed, or using a locator device in the seismic sensor unit. Individual far field signatures can be differentiated using coded source signals. For example, timing is established by firing a coded series of pulses at the start of a line. As an example one could fire 4 shots at 4 seconds and 2 shots at 2 seconds for the 42 line shot in the job. This would be easily detectable in the continuous record of the source signatures.

The time and/or location of the far field data and the acquired seismic data are used to correlate the far field signature with a seismic source or sources. Once the far field signature is identified for a seismic source or sources at a particular time and/or location, the seismic data acquired from a seismic receiver or receivers at the time and/or location is designatured. Additional processing may be performed, such as de-ghosting and inversion to analyze the data and estimate formation properties.

Methods described herein may be performed using a processor, processing device and/or processing system. An exemplary seismic data processing system includes a processing device or unit such as a computer (e.g., desktop or laptop). The processing unit includes a processor and a memory that stores suitable algorithms, software and/or programs for processing seismic data and/or analyzing subterranean formations. The processing unit may be located at or with a seismic data acquisition system, e.g., located on the vessel 12, or located remotely. The processing unit may be in communication with the sources 16 and receivers 18 to receive and process data in real time, or may access seismic data from a storage location. In addition, the processing unit is configured to receive far field signature data recorded by a far field signature measurement device, such as the seismic sensor unit 24 and/or 30. The far field signature data may be received via communication with the far field signature measurement device, or after retrieval of the measurement device and transmission of the far field signature data. For example, the processing unit may be connected to a host that includes suitable processors, storage, input/output interfaces and other components for storing, transmitting and receiving seismic data, which can be received and stored from multiple surveys at multiple locations. The processing unit and the host are not limited to the configurations described herein, and may include any suitable device or network including various processors, memory and communications devices.

Seismic data that is processed by the processing unit may be received from various databases or other storage devices, which can be internal or external to the host and/or processing unit. In addition, the host and/or the processing unit may be connected via the internet or other network to various external sources of data, e.g., databases or acquisition systems.

The embodiments described herein provide numerous advantages. The embodiments described herein allow for direct measurement of far field signatures without requiring complex deployment and data collection systems normally towed from the source vessel. Such direct measurement relieves the need to approximate the far field signature using near field signatures, which could increase processing complexity and reduce the effectiveness of seismic data processing. In addition, the far field signature recording devices described herein can be easily deployed without requiring precise positioning or specialized equipment for deployment.

For example, typical marine seismic acquisition systems and methods do not directly measure the far field signature, but rather approximate the far field signature using modeling software. Such software only provides an approximation of the far field signature, which may not be an accurate representation of the true far field signature. This is particularly the case for the low frequency response of air guns or gun arrays, e.g., below 7 Hz. Embodiments described herein address such deficiencies.

Generally, some of the teachings herein are reduced to an algorithm that is stored on machine-readable media. The algorithm is implemented by the computer processing system and provides operators with desired output.

In support of the teachings herein, various analysis components may be used, including digital and/or analog systems. The digital and/or analog systems may be included, for example, in a processing device or system such as those described herein. The digital and/or analog systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of measuring seismic signals generated by marine acoustic sources, the method comprising:
    deploying at least one variable depth sensor assembly on a floor of the body of water within a survey area, the at least one variable depth sensor assembly including a float, a seismic sensor unit, one or more seismic sensors deployed at different depths, a directional sensing device that allows seismic energy from different directions to be separated or individually recorded, and a recording device configured to receive and store seismic data;
    recording, by the recording device, seismic signals detected by the seismic sensor over a selected time period, the seismic signals including a real measured far field signature generated by a seismic source during a marine seismic survey;
    performing the marine seismic survey, the marine seismic survey including generating a seismic signal by the seismic source at a plurality of locations above one or more shot points in the survey area and receiving a return signal reflected from an earth formation at one or more seismic receivers located above the survey area;
    automatically actuating a retrieval device disposed at the at least one seismic sensor unit to cause the at least one seismic sensor unit to rise to the surface, in response to one of: expiration of the selected time period and an actuation signal from the surface;

retrieving the at least one seismic sensor unit from the surface; and processing seismic data collected from the return signal, the processing including identifying a far field signature of the seismic source for each of the plurality of locations based on the seismic signals detected by the seismic sensor, and designaturing the seismic data based on the far field signature to appropriately relate the far field signature to the correct shot point and time.

2. The method of claim 1, wherein recording includes continuously recording seismic signals during the selected time period.

3. The method of claim 1, wherein identifying the far field signature includes synchronizing the seismic data collected for each location with a portion of the seismic signals based on at least one of a location and a time period associated with the at least one seismic sensor unit.

4. The method of claim 1, wherein the at least one seismic sensor unit includes an actuator configured to automatically actuate the recording device to record the seismic signals in response to the at least one seismic sensor unit coming in contact with the floor.

5. The method of claim 4, wherein the at least one seismic sensor unit includes a plurality of seismic sensor units deployed at multiple depths in the body of water above the location, and recording includes recording the far field signature at the multiple depths.

6. The method of claim 1, wherein the seismic sensor includes one or more hydrophones configured to detect seismic signals propagating in a direction extending from the surface of the body of water toward the floor.

7. The method of claim 1, wherein the retrieval device includes an inflatable buoy.

8. An apparatus for measurement of seismic signals generated by marine acoustic sources, the apparatus comprising:
a variable depth sensor assembly that includes a float, a directional sensing device that allows seismic energy from different directions to be separated or individually recorded, and a seismic sensor;
a recording device configured to receive and store seismic data;
a housing assembly including a structure configured to house the seismic sensor and the recording device, the housing assembly configured to be released in a body of water and rest at one of a location on a floor of the body of water and a depth above the location;
a recording device actuator disposed at the housing assembly and configured to actuate the recording device to record seismic signals detected by the seismic sensor over a selected time period, the selected time period including a time during which a marine seismic survey is performed, the seismic signals including a real measured far field signature generated by a seismic source during the marine seismic survey; and
an automatic retrieval device configured to raise the housing assembly to a surface of the body of water for retrieval, the retrieval device including a retrieval device actuator configured to actuate the retrieval device in response to one of: expiration of the selected time period and an actuation signal from the surface.

9. The apparatus of claim 8, wherein the recording device is configured to continuously record the seismic signals during the selected time period.

10. The apparatus of claim 8, wherein the recording device actuator is configured to automatically actuate the recording device to record the seismic signals in response to the at least one seismic sensor unit being deployed on the floor.

11. The apparatus of claim 10, wherein the recording device actuator is configured to actuate the recording device in response to the housing assembly coming in contact with the floor.

12. The apparatus of claim 8, wherein the seismic sensor includes one or more hydrophones configured to detect seismic signals propagating in a direction extending from the surface of the body of water toward the floor.

13. The apparatus of claim 8, wherein the retrieval device includes an inflatable buoy.

14. The apparatus of claim 8, wherein the recording device includes at least one of a timer and a location device, and is configured to correlate the far field signature with at least one of a time and a location of the apparatus during the marine seismic survey.

15. A system for measurement of seismic signals generated by marine acoustic sources, the system comprising:
a plurality of seismic sensor units configured to be deployed from a surface of a body of water at different locations on a floor of the body of water within a survey area, wherein the plurality of seismic sensor units are buoyed by a float and wherein each of the seismic sensor units configured to record seismic signals autonomously and without physical connection to one another or to the surface, each of the plurality of seismic sensor units including:
one or more seismic sensors;
a recording device configured to receive and store seismic data;
a directional sensing device that allows seismic energy from different directions to be separated or individually recorded;
a housing assembly including a structure configured to house the one or more seismic sensors and the recording device, the housing assembly configured to be released in the body of water and rest at a location on the floor of the body of water;
a recording device actuator disposed at the housing assembly and configured to actuate the recording device to record seismic signals detected by the one or more seismic sensors over a selected time period, the selected time period including a time during which a marine seismic survey is performed, the seismic signals including a far field signature generated by a seismic source during the marine seismic survey; and
an automatic retrieval device configured to raise the housing assembly to a surface of the body of water for retrieval, the retrieval device including a retrieval device actuator configured to actuate the retrieval device in response to one of: expiration of the selected time period and an actuation signal from the surface.

16. The system of claim 15, wherein the recording device is configured to continuously record the seismic signals during the selected time period.

17. The system of claim 15, wherein the recording device actuator is configured to automatically actuate the recording device to record the seismic signals in response to the at least one seismic sensor unit coming in contact with the floor.

18. The system of claim 17, wherein at least one seismic sensor unit includes a plurality of seismic sensor assemblies configured to be deployed at multiple depths above a location on the floor, and configured to receive and store seismic data at the multiple depths.

19. The system of claim 15, wherein each of the one or more seismic sensors includes one or more hydrophones configured to detect seismic signals propagating in a direction extending from the surface of the body of water toward the floor.

20. The system of claim 15, wherein the recording device includes at least one of a timer and a location device, and is configured to correlate the far field signature with at least one of a time and a location of the apparatus during the marine seismic survey.

* * * * *